Patented May 25, 1926.

1,585,756

UNITED STATES PATENT OFFICE.

WALTER O. BORCHERDT, OF AUSTINVILLE, VIRGINIA, ASSIGNOR TO THE NEW JERSEY ZINC COMPANY, OF NEW YORK, N. Y., A CORPORATION OF NEW JERSEY.

TREATMENT OF MINERALS.

No Drawing.  Application filed December 11, 1922.  Serial No. 606,341.

This invention relates to the treatment of minerals, and has for its object the provision of certain improvements for promoting various mineral treatment operations in which the mineral undergoing treatment is associated with colloidal constituents in a mineral pulp.

The mineral treatment operations to which the present invention is advantageously applicable embrace a wide field and include such operations as aim to segregate a particular kind or class of constituent or constituents of the mineral, such, for example, as concentration, classification, dehydration, thickening, filtration, etc. Throughout this specification, I have used, the word "concentration" in a broad sense for describing any process wherein the purpose is the separation of one or more valuable minerals, or of their valuable constituents, from one or more less valuable (usually waste) minerals; or the separation of valuable minerals, or of their valuable constituents, from one another, and, therefore, including not only mechanical methods of separation, by which the mineral particles are rearranged in fractional products without intrinsic alteration, but also such chemical or quasi-chemical methods of separation as depend upon amalgamation with mercury, cyanidation, chlorination, distillation, sublimation, oxidation, reduction, solution in acids, aklalies or other reagents; by which the valuable mineral, or its valuable constituent, although changed in form, is separated from the other minerals with which it was originally associated, and is recovered in an alloy, salt, distillate, sublimate, metal, oxide, or chemical compound, etc., in which it exists in greater proportion than in the original mineral mixture.

While I shall, herein, for the purpose of simplicity, generally use the singular number in mentioning the valuable minerals, it will be understood by those skilled in the art that in some instances more than one valuable mineral species exists in a given mineral mixture or pulp, and that it may be desired to produce more than one kind of concentrate or product therefrom, as by a combination or succession of concentrating steps of the same or different kinds, with the result that each such concentrate contains, respectively, a greater proportion of some one mineral species or of its valuable constituents than the others, or than the original mineral mixture or pulp.

Since my invention is applicable to the preparation of many kinds of mineral mixtures for various mineral treatment operations, such, for example, as concentration, I wish to be understood when referring to "mineral pulp" as including in this term mixtures of natural or artificial minerals with a liquid, and, therefore, comprehending ores, tailings, middlings, smeltery slags, flue dusts, fumes, furnace products, manufactured materials, foundry or factory sweepings or similar débris, coal, coke, sand, gravel, concrete aggregate, rock crushed for agricultural purposes or for fertilizer manufacture, oil-shale, oil rock, oil-sand, etc., when mixed with a liquid to form a pulp.

The word "mineral", as herein used, is to be understood as including inorganic substances of substantially constant chemical composition occurring naturally in the crust of the earth; such inorganic but artificial substances analogous in structure and use to natural minerals, and which, by extension of thought, are in practice classed as minerals, and also such substances found in the earth as are organic in the sense that they are supposed to owe their origin to the plant or animal life of past geological ages, but are now classed as mineral. It will therefore be understood that I intend to include in the word "mineral" not only the well recognized natural minerals, metallic and non-metallic, but also metals, elements, smeltery slags, flue-dusts, foundry or factory sweepings or similar débris, coal, coke, bitumens, petroleum oils, etc.

For the purposes of explanation, the present invention will be particularly described as applied to the concentration of minerals, and the understanding of the invention derived from this description will enable those skilled in the art to successfully apply the principles of the invention to other mineral treatment operations.

Certain general principles are of universal application in the concentration of valuable minerals or of their valuable constituents from mixtures. All such mixtures must be prepared for concentration, usually by crushing, grinding, screen sizing or hydraulic classification, or by one or more of these steps. By such methods, a considerable part of the mineral mixture is reduced within a range of particle size which renders it amenable to treatment by one or more of the well known processes of concentration. However, it is inevitable that in so preparing the material, even by the most refined methods of graded crushing and classification, a part of the mineral mixture is ground so fine that, taken together with the fine particles resulting from blasting and other mining and handling operations, it constitutes what is known in the art as "slimes". Slimed material is, of course, not of uniform particle size. In fact, the range of particle size in slime is probably quite as great as, and may be much greater than, the proportionate range of particle size in the other fractional parts into which the mineral mixture is divided. Likewise, the slimed material may have approximately the same chemical composition as the original material or mineral mixture, or it may be that certain of the mineral constituents in such original material or mineral mixture, by reason of properties peculiar to them, or developed in them to a greater degree, may "slime" to a greater extent, and, therefore, be present in the "slimes" in greater proportion. The fact remains, however, that slimed material is always present in normally prepared mineral mixtures, and it always presents special problems in handling and treatment. In some special cases, it is desirable to slime the entire mineral mixture before concentration, but usually that is not desired and it is necessary simply to apply to the slimed portion of the mixture such special methods of concentration as may be found economically available.

A portion, be it large or small, of every slime, may be characterized as colloidal, and it is with this colloidal material that I have dealt in the discoveries which form the basis of the present invention.

It is well known that colloids and colloidal slimes, both organic and inorganic, often are present in mineral pulp, and when present in considerable amount, may have an unfavorable effect upon the concentration of such mineral pulp. When considerable amounts of colloids or colloidal slimes are thus present, it is usually necessary to operate in a more dilute pulp. The colloidal matters present in a mineral pulp are probably derived for the most part from the gangue or non-valuable particles of the mineral mixture, although it is not unlikely that valuable mineral particles may also be present in the pulp in the form of colloids. Such colloidal matters may also be introduced with the milling water which is used to form the mineral pulp, and this source of colloidal matters may be considerable during periods of heavy rainfall when surface waters containing mud and other suspended matters, and heavily charged with both organic and inorganic colloids, run into the source from which the milling water is customarily taken.

The colloidal matters may be present as pure colloids, organic or inorganic, or in a state bordering on the so-called "coarse suspensions." Throughout this specification and the appended claims, I intend to embrace in the expressions "colloids", "colloidal slimes" and "colloidal constituents" both true colloids and those quasi or borderland substances which may not be truly colloidal but partake of the qualities of, or resemble, colloids, and without regard to the sources from which such colloidal matters are derived. Thus, for the purposes of the present invention, the colloidal constituents may be considered as ranging from just above the molecular size upward through the class of so-called suspensoids, which, while possibly not true colloids, still, because of their relatively large specific surface, exhibit some, if not all, of the properties of colloids, and are capable of existing in both the sol or gel state, or of being dispersed and coagulated or flocculated and deflocculated. By a colloidal slime, therefore, I mean a material which is not necessarily a true colloid, but which exhibits colloidal characteristics to a sufficient degree to make it amenable to the manipulation hereinafter described.

It has heretofore been proposed to treat such mineral pulps, containing considerable amounts of colloidal slimes, with a coagulating or flocculating agent, in order to neutralize in part the objectionable effect of such slimes, but the coagulated or flocculated colloidal constituents remain admixed with the mineral pulp and often seem to form therewith adsorption compounds or colloidal complexes wherewith the mineral particles are entangled or enmeshed and the mineral treatment operation prejudiced thereby, as well as, in some instances, by the coagulating or flocculating agents which remain in solution in the mineral pulp.

It has also been heretofore proposed to deflocculate the colloidal constituents in a mineral pulp preparatory to a mineral treatment operation, but here again the deflocculated colloidal constituents, as well as the deflocculating agent when used, remain admixed with the mineral pulp during the subsequent mineral treatment operation.

The removal of "slimes" from a mineral pulp containing considerable amounts of colloidal slimes has also been heretofore proposed and practiced in what is generally known as "desliming" operations, but such operations as usually practiced are incompetent or inadequate to separate the colloidal from the non-colloidal constituents of the mineral pulp for several reasons, among which are the following. The colloidal constituents of mineral pulps are rarely, if ever, naturally deflocculated and dispersed to their maximum possible extent. Since aggregated or flocculated colloid masses act like solid particles of greater magnitude, the removal of the partially flocculated colloidal constituents of a mineral pulp by means of settling processes such as decantation, or even by washing with water on tables or vanners, is generally incomplete and inadequate. The agencies which promote the flocculation of the colloidal constituents of a mineral pulp also in general seem to promote the adsorption or other form of attachment which exists between such colloidal constituents and the granular constituents of the mineral pulp. It follows therefore, that in the ordinary practice of "desliming" as by decantation, much of the colloidal matter may remain with the granular matter of the mineral pulp even though, in the effort to remove it, decantation has been carried to the point where much of the finer granular matter has been decanted off of the mineral mixture.

As the result of my investigation, I believe that the injurious action on the concentraing operation of colloidal matters present in the mineral pulp may result from their presence in the mineral pulp, or may be due to their attachment to, or absorption by, certain minerals of the pulp, or the reagents introduced into the pulp to effect or assist concentration, or may be due to their combination, chemically, with such reagents, thus neutralizing them or delaying or inhibiting the action which they are intended to bring about, or may be due to their affecting the density or viscosity of the pulp, the settling rate of the mineral particles, the liquid holding capacity of the mineral particles, the entanglement or other form of aggregation of the mineral particles, the conductivity for heat or electricity or the magnetic permeability of the mineral mixture, or in other, and less obvious ways. Thus, the colloidal constituents of the mineral mixture may interfere with its effective screen sizing or classification, or with leaching, percolation, filtration, or similar steps employed for concentration or ancillary purposes, as by filling the pore spaces of certain minerals, or the interstitial spaces in the mineral mixture, or by clogging and obstructing the pores or crevices of filtering surfaces, or permeable partitions or diaphragms, or of fluid absorbing or emitting surfaces, or of surfaces designed to have a certain degree of "grain" or roughness, as, for example, the active surfaces of concentrating devices, such as shaking tables of the Wilfley type, vanners, canvas-plants, buddles, amalgamated plates, greased tables, etc. It is my belief that these colloidal matters may interfere with concentration operations whether they exist in a flocculated (or coagulated) or in a deflocculated (or dispersed) condition, but I have found that in general their action is less marked when dispersed or deflocculated.

The present invention in its broad aspect contemplates, as an improvement in the treatment of minerals and more particularly in the concentration of minerals, and as a preliminary step to the treatment or concentration operation proper, the removal, in whole or in part, of colloidal constituents from the mineral pulp by a flotation treatment under conditions permitting the removal by flotation of a part or the whole of the colloidal constituents while substantially inhibiting the flotation of mineral particles. After the removal of the colloidal constituents from the mineral pulp by a preliminary flotation treatment in accordance with the principles of the present invention, the mineral pulp thus freed to the desired extent of the colloidal constituents is subjected to the contemplated mineral treatment operation, such, for example, as a concentration operation.

Thus, according to the present invention, the mineral pulp containing the colloids or colloidal slimes is subjected to a preliminary flotation treatment with an appropriate agent or agents, the object of which is to produce a froth or scum containing part or the whole of the colloids or colloidal slimes, with a relatively small proportion of the valuable mineral or minerals contained in the pulp, and to separate this colloid-bearing froth from the bulk of the pulp, after which the remaining mineral pulp is subjected to the contemplated mineral treatment operation.

The colloid-bearing froth may itself be further treated for the recovery of such valuable minerals as it may contain, or it may be run to waste, but in either event the principal part of the valuable mineral or minerals contained in the pulp is, by the practice of my present invention, treated, in the contemplated mineral treatment operation, under conditions which facilitate and expedite such treatment, and, in the case of a concentration operation, under conditions which enhance the recovery of valuable minerals.

In some cases the colloid-bearing froth when produced as described may contain too much valuable mineral to permit of throwing it away. This mineral may be carried over in part mechanically entangled with flocccules of colloidal material; in part as colloidal complexes or mineral particles with adsorbed colloid coatings which cause them to act like gangue or colloidal particles rather than mineral particles; and in part simply in mechanical suspension in the froth, because of their fine size and the rapid formation of the froth. In order to separate this mineral from the colloid-bearing froth and return it to the mineral pulp which has been treated as described for the removal of colloidal material, the froth may be subjected to the action of mechanical froth-breakers or of water or air jets to break it down, as is commonly done in froth-flotation plants, and if the froth contains flocculent material, as would ordinarily be the case, a deflocculating agent may be added, as well as water for dilution of the broken-down froth-pulp to the desired degree. The kind and amount of deflocculating agent, and the amount of water required may be readily determined for a specific colloid-bearing froth by means of simple tests.

The deflocculated pulp resulting from the foregoing described treatment may be then run to settling tanks, which may be of the continuous type, such as Dorr, Allen, or Callow tanks or similar apparatus, or intermittent tanks, such as are commonly used in the arts and are too well known to require description. In these tanks sedimentation or settling may take place, the minerals and coarse gangue particles settling toward the bottom, and being removed continuously or intermittently. The deflocculated colloidal material, together with much of the agent used to form the colloid-bearing froth, having a much slower settling rate, remains in suspension and is continuously or intermittently overflowed to waste. The settled material, containing the mineral, may be further treated in a similar manner, if the first treatment has not sufficiently removed the colloidal material and the froth-forming agent, and is then diluted with water as desired and returned to the body of the pulp which has been treated for the removal of colloids.

In some cases, simple breaking down of the colloid-bearing froth and dilution with water may be sufficient to render possible the separation of the colloidal constituents from the mineral particles and the return of the latter to the main body of mineral pulp, or in special cases leaching of the minerals with chemical agents, or treatment with sulfidizing agents to make oxidized minerals amenable to flotation, may be indicated to recover the valuable mineral, but the need for such treatments and the procedures to be supplied will in such cases be apparent to those skilled in the art to which this invention pertains.

I have also discovered that while colloids or colloidal slime present in a mineral pulp often exercise an inhibiting effect upon the concentration, and especially the concentration by flotation, of the valuable minerals therein, that this effect generally varies in strength as respects different minerals; and also, as respects any one mineral, that the inhibitory effect varies approximately in proportion to the amount of colloidal material present; and that the state in which colloids exist also has a bearing, the inhibitory effect being generally less marked when the colloidal constituents are dispersed or deflocculated.

The removal of the colloids or colloidal slimes by the production and separation of a colloid-bearing froth may be conducted in one step, as a preliminary operation, when only one valuable mineral is concerned in the subsequent mineral treatment operation, or it may be conducted in two or more steps, each removal of colloids or colloidal slimes by a flotation operation being followed by an appropriate mineral treatment operation directed particularly towards the recovery or treatment of a particular valuable mineral. For example, I have found that, for certain purposes, it is desirable to retain part of the colloidal constituents in the mineral pulp, and that, when a proper amount of such constituents is present, it is possible to effect a differential separation or concentration of a certain valuable mineral species of a mineral mixture, while the separation of another vauable mineral species is retarded or inhibited by the colloids or colloidal slimes remaining in the mineral pulp; and that, thereafter, by a further removal of a part or all of the remaining colloids or colloidal slimes, in the manner herein contemplated, separation or concentration of the remaining valuable mineral species can be effected.

As a result of the investigations which I have made, I have been led to believe that colloidal adsorption takes place upon metallic surfaces and upon the surfaces of sulfides and other minerals, but that the strength of the adsorption varies considerably, depending upon the character of the colloid, its relative concentration, the kind and character of adsorbing material, and its temperature and condition of electrical charge. I do not, however, desire to limit myself by any theoretical explanation of the principles underlying the present invention. Whatever may be the correct explanation, of the prejudicial effect of colloids when present, and of the advantages resulting from their removal, the process of the present invention involves the separation or removal from the mineral pulp of the colloids by a preliminary flotation operation, and in whole or in part (whether adsorbed by or otherwise combined or admixed with the minerals), as a preliminary or preparatory step to a mineral treatment operation.

Agitation of the mineral pulp may in some instances be required in order properly to prepare the colloidal constituents for removal from the pulp by froth flotation, and for the proper incorporation of the agents necessary for the preparation of the pulp for flotation as well as for the formation of the flotation froth. Such agitation may readily be effected in apparatus well known in the ore dressing art.

Increase or decrease in temperature may be similarly of assistance in bringing the colloids into a state permitting their removal by flotation from the mineral pulp. The optimum temperature in the case of any particular mixture, for promoting removal by flotation of the colloidal constituents contained in the mineral mixture, may be determined by tests, in which the other factors are held constant and the temperature varied through a wide range. Where this optimum temperature is higher than the normal temperature of the mineral pulp, the mineral pulp may be heated to the desired temperature by direct heating or by the use of steam-heating coils, or by steam blown into the pulp, and where this optimum temperature is lower than the normal temperature of the mineral pulp, the pulp may be cooled by dilution with cold water, by cooling coils, by cooling towers, etc.

I have found that the necessary distribution through the mass of the mineral mixture of the agents used for promoting conditioning or flotation of colloidal constituents can be very conveniently and effectively brought about by adding the agent to the mineral pulp at some point prior to the admission of the mineral mixture to the ball or pebble mills, or other fine grinding machines. Such machines almost invariably form a part of the equipment of concentrating plants. By so adding the agent to the mineral mixture ahead of the fine grinding mills, the necessary armixture is secured without inconvenience or added expense, and the treatment of the colloids or colloidal slimes prior to the removal by flotation from the mineral pulp may take place under the most favorable conditions.

After the colloids or colloidal slimes have been removed to the desired extent (that is, in whole or in part depending upon the result desired), the remaining mineral pulp, which may now be in a more concentrated state with respect to its solid phase, is subjected to the contemplated mineral treatment operation. To this end, the pulp may be further thickened or dried, or it may be diluted, depending upon the nature of the subsequent mineral treatment operation, and then subjected to appropriate treatment for securing separation of the valuable minerals from the waste or less valuable minerals. The removal of the colloids from the mineral mixture often enables the mineral mixture to be treated in a state of greater density, that is, in a more concentrated form with respect to its solid phase, with the result that an increased tonnage of mineral mixture can be handled by a given plant.

The colloidal slimes which are separated from the mineral pulp are commonly of a character such that they may be run to waste. In case, however, the slimes carry sufficient values, they may be themselves subjected to a further treatment for the recovery of the values therefrom.

The liquid accompanying the removed colloids may be separated and recovered for reuse. The colloids contained therein may thus be coagulated and settled or filtered out. The liquid separated from the colloids may be purified, if necessary, to free it from dissolved salts prejudicial to the mineral treatment operation in which it is to be subsequently used.

If the original mineral mixture contains several valuable ingredients such as sulfides, the removal of the colloidal constituents in accordance with the principles of the present invention may be carried out in a number of stages in order to take advantage of the selective inhibition of the colloids or colloidal slimes toward the selection of certain of the minerals. For example, in a mixed sulfide mineral mixture, containing sulfides of lead, zinc and iron, which it is desired to treat by the well known froth flotation process, the mineral mixture may be treated for the removal of a portion only of the colloidal slimes in the manner hereinbefore described, so that there will be retained in the mineral pulp sufficient of the colloids to prevent any considerable flotation of the iron and zinc sulfides while permitting the flotation of the lead sulfide, whereby there can be obtained by flotation a lead concentrate relatively free from zinc and iron. The remaining mineral pulp (tails from the aforementioned flotation operation) may then be treated for the removal of an additional portion of the colloids, whereby flotation of the zinc, or flotation of the zinc and iron, may be readily effected. Where the zinc is floated without flotation of the iron, a still further removal of the colloids from the remaining mineral pulp may then be effected in order to permit flotation of the iron sulfide. In carrying out differential flotation of different minerals, advantage may also be taken, in each case, of the well known selective qualities of certain oils, or other flotation agents, for the various minerals, such selective qualities supplementing the selectively inhibitory action of the colloidal constituents.

It will be seen that the present invention thus involves the separation from the mineral pulp, prior to concentration or other mineral treatment operation, of colloidal constituents by a preliminary flotation operation so that the concentration or other mineral treatment operation is carried out without interference from the colloids, or with such regulated action of the remaining colloids as is desirable for the particular object in view, as in case a differential separation of certain minerals is desired.

Where the mineral pulp contains, in solution in the liquid thereof, substances which prevent bringing about the desired preliminary condition of the colloids, or the flotation thereof, such substances may be in part or in whole removed, as, for example, by the removal of the liquid from the mineral pulp, prior to treatment, or they may be otherwise neutralized and rendered harmless by methods and agents which are generally known, and can be regulated by simple tests. For example, an excessive quantity of magnesium sulfate or of some other electrolyte in the mineral pulp may interfere with the proper action of sodium silicate as a dispersing agent. Such a condition may be corrected by washing the mineral for the removal of soluble salts. Where the mineral pulp is acid or where there is latent acidity, due to the occlusion of sulfur dioxide, an alkali may be added to correct the acidity, whereby the sodium silicate is enabled to act in the desired manner.

The principles of the present invention are of special advantage when applied to processes of differential concentration, particularly differential flotation. Thus by the proper application of these principles it is possible to secure the differential concentration of certain mineral species while inhibiting the concentration of other mineral species. This result is brought about by forming a colloid-bearing froth by means of an appropriate agent, employing for this purpose any of the flotation machines employed for the production of mineral froths in the ordinary flotation processes, such as the minerals separation, Callow, Janney, K. & K., etc., but preferably the Callow or other pneumatic machines, (since in these the action is more readily controlled), removing this froth from the mineral pulp and either discarding it or subjecting it to further treatment independent of the mineral pulp. After sufficient of the colloidal constituents have been removed the remaining pulp is subjected to an appropriate concentration operation, for example, flotation, and a concentrate obtained composed principally of one of the valuable mineral species of the pulp. The residual pulp from this concentrating operation is then again treated with suitable agents in a suitable flotation machine for the production of a second colloid-bearing froth, which is also removed and discarded, or retreated as may be desired; and the remaining pulp is then subjected a second time to an appropriate concentration operation, such as flotation, for the recovery of a concentrate composed principally of a second valuable mineral species, this sequence of operations being repeated as many times as is necessary for the separation of each of the valuable mineral species in the original mineral pulp, singly or in groups.

As an example of the application of this aspect of the process of the present invention, I will describe the treatment of an ore like that found at Austinville, Virginia, which contains the sulfids of lead, zinc in a gangue of iron and dolomitic limestone, and in which the colloids or colloidal slimes are present in such quantities as to seriously interfere with the recovery of the valuable minerals by the usual concentration processes.

To the finely ground ore, which has been made into an ore pulp by admixture with water, is added a small amount, for example, one-half pound per ton of dry ore, of a rosin soap in solution in water. After thorough mixture the pulp is passed into a Callow flotation cell, through the porous bottom of which air under pressure is admitted in fine streams to form minute air bubbles. These air bubbles, with the rosin soap and the colloidal constituents of the ore pulp, form a colloid-bearing froth which rises to the surface of the pulp in the cell, and overflows into an appropriately placed launder, which conveys it to a tank for further treatment or to waste. After sufficient of the colloidal constituents have thus been removed, the ore pulp is conveyed to an appropriate concentration apparatus, such for example as another flotation cell where a mineral floating agent, as for example, emulsified wood creosote oil, is added and a galena froth is obtained. The residual ore pulp is then mixed with an additional small quantity of rosin soap, for example, one-quarter pound per ton of dry ore, in solution in water, and passed into another flotation cell, where a second colloid-bearing froth is formed and removed as before. The ore pulp is now passed to another concentration apparatus, such as another flotation cell and a small amount of pine oil and crude petroleum oil in emulsion and a small amount of copper sulfate solution are added, and a flotation operation conducted for the formation of a blende froth, which is removed and further treated as is customary. To the remaining ore pulp is then added a further small amount of rosin soap, for example one-quarter pound per ton of dry ore, in solution in water, and the ore pulp is then passed into another concentration apparatus, such as another flotation cell where the remainder of the colloidal constituents of the ore pulp are removed in the form of colloid-bearing froth as before. The ore pulp is then preferably mixed with a small quantity of sulfuric acid, for example, one-half pound per ton of dry ore, and with emulsified pine oil and crude petroleum oil and passed into a flotation cell where a mineral froth containing the pyrite is formed and removed, while the final tailings pulp from the cell is sent to waste.

According to the present invention, the colloidal constituents of the ore pulp which are to be removed in whole or in part by the formation of a colloid-bearing froth, may be in either a flocculated or deflocculated condition, the preference being determined by economic considerations, depending upon the kind of valuable mineral or minerals contained in the ore, the amount of colloidal matter present, the average fineness of the valuable minerals, the tendency or otherwise of the flocculated colloids to enmesh or entangle valuable mineral, the soluble contaminants of the mineral pulp, the degree of dilution of the mineral pulp, the subsequent treatment to which the colloid-bearing froth and mineral pulp or mineral concentrate, respectively, may be subjected, the tonnage to be treated, the cost of water and agents, etc. In any actual case the natural character of the ore and other fixed conditions will determine certain features of the exact method of treatment, while the preference as to other features may be readily determined by simple tests which will in each case be suggested by the problem itself.

There are several aspects from which the process of the present invention must be viewed in order to understand the several means and agents which may be required to effectually carry out the several steps which may be necessary in connection with the preparation of a given mineral mixture for a mineral treatment operation.

It is important to observe that in order to effect the removal of inhibitory colloidal constituents from a mineral pulp they must generally also be detached from the granular particles to which by adsorption or otherwise they may be adherent, and to release granular particles from entanglement with colloid masses such as floccules or coagules with which they may be enmeshed. As previously noted, the colloidal constituents of mineral pulps are naturally usually flocculent and in the practice of the present invention it may frequently be necessary or desirable to more completely disperse or deflocculate such colloidal constituents in order to facilitate their removal from the granular particles of the mineral pulp and to release granular particles from colloid entanglement.

Since the actual removal of the colloids from the mineral pulp is often facilitated by having them in a flocculent condition at the time of the formation and removal of the colloid-bearing froth, it follows, that in order to conduct the process to the best advantage it may in such cases be necessary to first deflocculate or disperse the colloidal constituents so as to facilitate their disengagement from the granular particles, and subsequently flocculate or coagulate them in order to facilitate their collection and separation from the mineral pulp by means of a colloid-selective froth-flotation operation, this step preferably being carried out under conditions which inhibit any tendency of the colloids to again entangle granular particles or to absorb thereon or from colloid-complexes therewith.

Such steps, preparatory to the actual formation and removal from the mineral pulp of colloids by means of a colloid-selective froth, I group under the term "colloid-conditioning" steps and I will describe the methods and agents which may be used under different conditions so that their application and control will be clear to one skilled in the art to which this invention relates.

In many cases it will be found that the colloidal constituents of mineral mixtures are in part at least attached to the valuable minerals of the mixture, forming adsorption films thereon, or colloidal complexes. In such cases it may be necessary to use means and agents to insure the detachment from the mineral surfaces of the colloidal matter. Such means and agents as will readily be understood are perhaps of the nature of "detergents" or cleansers, and serve a purpose which is wholly distinct from the production of the colloid-bearing froth, although in some instances the same agents and means may suffice for both purposes.

Thus a soap may be used for its "detergent" action as well as for its value as a colloid-selective frothing agent, and agitation or regulation of temperature, or both, may be required to facilitate the detergent action, and may also aid in the formation of the froth.

Sodium silicate is often valuable as an agent for promoting the removal of colloidal matter from granular particles. It must be used in a neutral or alkaline pulp to give the best results, and when so used it may act both as a "detergent" and as a deflocculating agent. Similarly, gum arabic, (acacia) "foundry molasses" and trisodium phosphate are useful agents for promoting dispersion or deflocculation and aiding in the removal of colloidal matter from granular particles.

When the colloidal matters present in the ore pulp require to be flocculated in order to facilitate their removal from the mineral pulp by the process of the present invention, means and agents may be employed for that purpose which are well known to those skilled in the art to which this invention relates. Thus various acids, such as sulfuric or hydrochloric acid may be used, or alkaline agents, such as the soluble hydroxides, or salts such as magnesium sulfate, alum, aluminum sulfate, the chlorides etc.

In general, it may be said that the choice of agent or agents to be used for "conditioning" the colloidal constituents of the mineral pulp in order to facilitate their removal from the latter by means of the formation and removal of a colloid-bearing froth, will be guided by the principles of general and colloid chemistry, and in any actual case, due consideration being given to the further treatment to which the pulp is to be subjected, the choice of agents will be made as the result of a series of tests such as may be made by any one skilled in the art. Whether the agent be chosen for what I have called its "detergent" action, or whether it be chosen for the purpose of securing flocculation or deflocculation it must of course be properly selected with reference to the colloidal properties of the mineral mixture and in accordance with the known principles of colloid chemistry so that the desired action may take place. The nature of the agent will accordingly vary somewhat with different mineral mixtures, because the colloidal constituents vary, in some cases being of a basic character and in others of an acid character, and in some cases being positively charged, and in other cases being negatively charged. The agent may thus be of an acid character, in case the desired "conditioning" of the colloids may thus be brought about, or of an alkine character, if the preliminary tests indicate this to be desirable. The agent or agents may themselves partake of a colloidal character as, for example, silicic acid or sodium or potassium silicates, or soaps which also display acid or alkaline characteristics.

In connection with the removal of colloid "films" or adsorptions or coatings from granular particles, or the breaking up of colloid complexes or entanglements which affect the valuable mineral particles of the pulp, I have called attention to the importance of preventing or inhibiting the reforming of such "films" or complexes while the colloidal constituents are still present in the pulp. In many instances the time factor necessary for such adverse actions to occur is naturally so long that the step of forming and removing the colloid-bearing froth may be carried out before the adverse action has time to take place, especially if the proper conditions for suppressing or delaying such action are determined by tests and made effective. In other cases I have found that maintaining the mineral pulp in a state of agitation or that regulating its temperature is sufficient to maintain the colloids in the desired state until the separatory step can be taken.

In still other cases I find that it is advisable to employ an agent for the purpose of forming with the colloidal constituents preferential complexes or adsorption products, thereby preventing them from forming undesired combinations with the minerals of the pulp. Thus I have found that in some cases it is advisable to introduce an oil, grease, fat or tar, preferably in an emulsified condition, and that the colloids seem to form therewith combinations which serve to prevent them from again combining with or adhering to the minerals, and often also facilitate the collection of the colloidal matters in the colloid-bearing froth. I call agents used for this purpose "gathering agents" and I have found that crude petroleum oils, fuel oils and some of the fatty acids are often useful for this purpose, as are also, in some cases, certain chemical precipitates, such as the hydroxides of calcium, magnesium, aluminum and iron. Sometimes such precipitates can be secured by the skillful use of one or more substance naturally occurring in solution in the water of the mineral pulp. In other cases I have found that the removal of the colloidal constituents may be facilitated by adding to the pulp such substances as finely divided carbon, in the form of powdered coal, coke or charcoal, or sawdust or similar substances which possess the power of holding to themselves the colloids which it is the purpose of this invention to remove from the mineral pulp.

It will be well understood that the agent used for forming the flotation froth must be such as will be selective for the colloidal constituents, rather than for the valuable mineral which it is desired shall be retained in the pulp. Tests similar to those commonly made to determine the agents suitable for the froth flotation of valuable minerals, as will be well understood by those skilled in the art, will suffice to determine in a given case which of the various available agents will be best adapted to the production of the desired colloid-bearing froth.

In the production of colloid-bearing froths, many agents or combinations of agents are available. One at least of the agents must be such as will be capable with air or gas bubbles in the pulp of forming a froth or scum which will rise to the surface of the pulp. In the investigation of this discovery, I have found many agents, both organic and inorganic which are effective, but their relative value in the case of any given ore will depend upon a variety of factors, some of which are mentioned above, and simple tests will in any event determine the most suitable agent or agents. I have found in practice that pine and hard wood tar oils, rosin oils, high temperature distillates, or in general oils with a high pitch content, make excellent agents for the formation of colloid-bearing froths substantially non-selective for the valuable minerals present in the ore pulp. Soaps of various kinds, and especially rosin soaps, are excellent with some ores, and generally give abundant froths, and oleic acid and oleic soaps are often useful. In many cases the same oil or oils which are used for the production of a mineral froth with a given ore will yield an excellent colloid-bearing, substantially non-mineral-selective froth for the purpose of the present invention, if simply used in excess over what would be practicable for the formation of a mineral bearing froth. In such cases as the last a very simple operation may result, as it is well known that, when a frothing agent is added to water and a froth is produced, that the greater part of the frothing agent concentrates in the froth, and is consequently eliminated with it from the pulp, from which it results that after the colloidal constituents of a pulp have been removed by means of a colloid-bearing froth, that the remaining frothing agent in the ore pulp may be sufficient for the production of a mineral froth according to the usual processes.

In such cases as it is necessary to use for the formation of the colloid-bearing froth an agent or agents whose residual presence in the ore would be objectionable in the subsequent mineral treatment operation, it is possible to neutralize such residual portions by commonly understood chemical means, and I have found, as a result of my investigations, that when an ore pulp has been approximately freed of its colloidal constituents, that mineral concentration, particularly flotation, can be conducted satisfactorily in the presence of much larger quantities of soluble impurities than would otherwise be practicable.

In my copending application, Serial No. 584,572, filed August 26, 1922, (the same being a continuation in part of my application, Serial No. 283,628, filed March 19, 1919) for improvements in the treatment of minerals, I have described and claimed, as a preliminary step in the treatment of minerals and more particularly in the concentration of minerals, the removal, in whole or in part, of colloidal constituents in a dispersed or deflocculated condition from a mineral mixture or pulp. In the aforementioned application, I have particularly described the treatment of a mineral pulp for dispersing or deflocculating the colloidal constituents therein, as, for example, by the addition of an appropriate dispersing or deflocculating agent to the mineral pulp, and the removal of the dispersed or deflocculated colloidal constituents to a desired extent from the mineral pulp in any appropriate manner, as, for example, by sedimentation of the mineral particles and separation of the dispersed or deflocculated colloidal constituents by decantation. The method of my present invention for the removal from a mineral pulp of colloidal constituents by a flotation treatment and the formation of a colloid-bearing froth may advantageously be employed in conjunction with the method of my aforementioned application for removing colloidal constituents in a dispersed or deflocculated condition from a mineral pulp. For example, the combination of these two methods of colloid-removal may be of particular advantage in connection with differential concentration of minerals. Thus, in certain cases, it will be found of advantage to initially apply the colloid-removing method of my aforementioned application so as to make possible the concentration of one valuable mineral species in the mineral mixture or pulp while inhibiting the concentration of other valuable mineral species therein, and after the contemplated concentration operation in which the one valuable mineral species is removed to the desired extent from the mineral pulp or mixture, then preparing the residual mineral pulp by the colloid-removing method of my present invention for the concentration of other valuable mineral species remaining therein. In other cases, it will be found more advantageous to initially apply the colloid-removing method of my present invention, and subsequently the colloid-removing method of my aforementioned application.

In the case of the ore mined at Austinville, Virginia, I find that if the colloids are removed by the method of my aforementioned application to the point where a good galena forth can be produced from the remaining pulp by a flotation operation, that it is often difficult to make the galena froth pick up the coarse galena particles without carrying over an undue proportion of blende. This results from the fact that when part of the colloid is removed the differentiation between that part of the galena which is most difficult to float (that is the coarse galena particles) and that part of the blende which is easiest to float (that is the fine blende particles) is not sufficiently marked to give a sharp or clean-cut separation. In such cases, I find that if instead of using the method of my aforementioned application I use the method of my present application employing a soap as for example rosin soap, to make a very heavy over-stabilized colloid-bearing froth and also employ some wood creosote, as a galena-selective agent, that I can carry into the colloid-bearing froth, not only so much of the colloid that the blende can thereafter readily be floated from the remaining pulp, but I can also carry into this colloid-bearing froth, by means of the galena-selective wood creosote, practically all of the galena contained in the pulp. I can then take this over-stabilized galena-bearing froth, break it down, deflocculate the colloidal constituents therein to the desired extent with sodium silicate and decant off the deflocculated colloidal matter together with the bulk of the water and most of the soap and creosote, leaving as a sediment, the galena, accompanied by a little blende and a certain amount of gangue. The sediment thus produced can readily be treated by flotation to separate a high grade galena concentrate from the gangue.

The colloidal-bearing froth produced in accordance with the principles of my present invention may thus intentionally or otherwise contain such an amount of valuable minerals as to render economical the subsequent treatment of the colloid-bearing froth for the recovery therefrom of these valuable minerals. The minerals thus recovered from the colloid-bearing froth may be returned to the remaining ore pulp from which the colloids were removed, or may be separately treated for the concentration of the values therein. Where, as described in the preceding paragraph, the colloid-bearing froth is deliberately made to include a valuable mineral species, it will generally be more advantageous to separately treat this colloid-bearing froth as, for example, by the method of my aforementioned application, for the removal of the colloids therefrom, and then treat the remaining mineral matter for the recovery of the valuable mineral species.

It will also be understood that when the process of the present invention is applied to the concentration of several mineral species from a single mineral pulp, as, for example, by the differential froth flotation process, that it may sometimes advantageously be combined with well known differential flotation processes which depend for their effectiveness in permitting the flotation of one mineral species, while inhibiting that of another, upon the use of certain chemical agents, such as sulfur dioxide, acids, permanganates, or other salts. When so used, these agents must of course be such as will either enhance, or at least not prevent, the "colloid-conditioning", "gathering" and "colloid-removing" steps contemplated by the present invention, and in each actual case tests must be conducted on the given mineral mixture to determine the sequence of operations and the agents which may best be employed to secure the desired results.

The present invention is applicable to different concentration processes and with various means or reagents or agents which are used to effect or facilitate concentration. Thus, the amalgamation of certain ores of gold and silver has proved difficult or impracticable because of the presence of oil, grease, tallow, talc, serpentine, graphite, clay and other substances. The "saprolitic ore" of the Appalachian gold belt is an example. When substances of colloidal character, such as those mentioned and many others, are present in the ore pulp, they seem to attach themselves to or to combine with the precious metal or the amalgam, or to both. The result may be "hard" amalgam or "sickening" or "flouring" of the mercury, resulting in failure of the amalgam to catch and retain the precious metal. Simple tests will serve to show whether loss of precious metal values is indeed due, in any given instance, to the presence of such substances, and equally simple tests, which may be performed by anyone skilled in the art to which this invention relates, will develop what reagents are required to produce or maintain the optimum condition of the injuries colloidal constituents, so that they may be removed from the ore pulp to the desired extent by a flotation treatment befor the latter is subjected to amalgamation treatment for the recovery, in concentrated form, of its precious metal content.

In cyanidation, chlorination, acid or alkali leaching or similar processes of concentration of mineral mixtures, the presence of colloidal constituents may be objectionable in various ways, as by absorption or other form of attachment of the colloidal constituents by the valuable mineral particles, or by adsorption by the colloidal constituents of the reagents used in or preliminarily to the process of concentration, or by neutralization or other form of chemical combination of the added reagents with the colloidal constituents (the extremely fine state of division of the latter often serving to permit reactions which would be either non-existent or too slow to be troublesome between such reagents and coarser particles having chemical composition similar to that of the colloidal constituents); or by mechanical interference with the porosity or permeability of the mineral mixture, or of parts of the necessary apparatus, thus injuriously affecting the percolation of solutions, the functioning of porous septa or diaphragms, etc.

In such chemical or quasi-chemical methods of concentration, it is common to preliminarily separate the slimed from the granular portion of the mineral pulp and treat these portions separately by processes depending upon the same or different principles. From such a procedure, the method of the present invention is readily distinguishable, since it is not my purpose to separate the slime as a whole from the granular portion of the mineral pulp, but, on the contrary, the present invention involves the separation of the colloidal constituents in a flotation froth from the slime and granular material. Thus, the application of the invention in a given instance may, by the removal of the colloidal constituents, render unnecessary any separation of the slimes from the sands, and the thus removed colloidal matter may be of such character as not to require or deserve treatment, or it may be so slight in quantity compared with the slime as a whole as to require smaller apparatus or a less quantity of reagents.

The adsorption or other form of attachment of the colloidal constituents of a mineral mixture to the granular particles thereof is a matter of common knowledge. Regardless of whether the actual concentration of the valuable mineral is effected from a pulp or from a dry mineral mixture, the preliminary removal of the colloidal constituents in accordance with the principles of the present invention generally leads to improved results. Thus, the colloidal matter, if valuable, may be saved from being lost with the granular waste minerals to which it is in part adherent, whilst, if valueless, it may thus be prevented from adhering to and contaminating the concentrate particles. These considerations are of moment in the preparation of a mineral mixture for dry electrostatic or magnetic concentration. Similarly, in wet magnetic concentration, the presence of colloidal matter, particularly when flocculated, may injuriously affect the freedom with which the magnetic particles may be separated from the remainder of the pulp, the slightest entanglement of the magnetic particles being the cause of inferior concentration.

In the process of jigging mineral pulps, it might be supposed, since relatively coarse particles are dealt with, that colloidal constituents might have unimportant influence. On the contrary, it is known that "slimes", when present in the ore being jigged, may seriously interfere with the operation, because they segregate in the places where the agitation is not so severe, or where there are eddy-currents, and form "hard spots", or they may render the jig-bed dense and "gummy". It is, indeed, sometimes the case that the slimes form spots or rims in the jig-bed, through which gangue finds its way into the jig-tank or "hutch". I have discovered that this well known and objectionable action of slimes in jigging may be overcome if the colloidal constituents of the pulp are removed therefrom, in the manner set forth in this specification, before jigging, and it seems probable that the reason for this improvement in results is to be found in the fact that when the colloidal constituents are absent the interstitial spaces in the slimes are filled with water, having low viscosity, instead of with a colloid-water complex having high viscosity, and the mobility of the jig-bed is thereby insured, permitting it to function, as desired, in accordance with the laws of "hindered settling." The effect of the removal of colloidal constituents is in general quite marked. In a specific case I have found that in jigging on a Hancock jig a pulp consisting of the sulfids of lead, zinc and iron in a dolomite gangue, all particles of which were through a screen with one-quarter inch square openings, that it was necessary to remove all material finer than fourteen-mesh Tyler standard, in order to permit satisfactory jigging; unless the colloidal constituents were preliminarily removed from the pulp. When this was done, it was no longer necessary to screen or hydraulically classify the pulp, but the entire pulp, minus the removed colloidal constituents, could be jigged with satisfactory results. Preliminary removal of the colloidal constituents frequently permits also of greater economy in the use of water and allows the jig water to be used over and over without being clarified.

I have previously alluded to the beneficial results which follow the withdrawal of colloidal constituents from mineral-pulp which is to be treated on shaking or bumping tables, vanners, bateas, slime-tables, buddles, canvas, carpet, or blanket-plants, etc. In all such devices it is of great importance that the mobility of the pulp-mass be insured, in order to permit of the requisite stratification of minerals, graded by density, size and shape, and that the pulp receiving surface of the device be maintained in its original grained, pitted or otherwise uniformly-roughened condition. If the interstitial spaces of the pulp are filled with colloidal constituents the heavy minerals cannot readily settle to the lowest stratum and the lightest minerals cannot readily separate at the top and wash away. If the minute pits or depressions of the linoleum, wood, concrete, rubber, metal, cloth, or other material of which the acting surface of the device is composed, become filled with colloidal matter, the effect is the same as though the table top were lubricated or made of perfectly smooth and frictionless material. Under such conditions the forward-driving effect of the table-top is lost, (in devices like the Wilfley table where this action is a factor), or the desired conditions of particle equilibrium are disturbed, so that certain particles continue to slip under conditions in which they should come to, and continue at, rest.

The effects of the colloidal constituents of mineral pulps in interfering with classification of minerals by screening and hydraulic classification have been recognized. In screening, the colloidal matter, particularly if flocculated, tends to remain in part with the coarse product, clogs the screen openings and entangles fine particles. In hydraulic classification, both according to "free-settling" and "hindered-settling" principles, the presence of colloidal matter is objectionable. As previously stated, the colloidal constituents tend to envelope fine particles, adhere to coarse grains, and to hold excess water in the settled mass, by virtue both of their intrinsic water-holding ability and by the wider spacing of particles which results from their presence. The effect of the colloidal constituents in affecting the density and viscosity of the liquid of the pulp, has been referred to. In devices like classifiers, jigs, settling tanks, kieves, etc., in which the principles of "free-" or "hindered-settling" classification are usefully employed, the presence of the colloidal constituents of the mineral pump may be, and often is, harmful. Their adverse influence may be overcome by removing them from the pulp to the degree desired, in accordance with the principles and methods set forth in this specification.

I claim:

1. The method of improving the treatment of minerals associated in a mineral pulp with colloidal constituents, which comprises subjecting the mineral pulp to a colloid-selective froth-flotation operation adapted to remove from the mineral pulp a substantial amount of said colloidal constituents, and thereafter subjecting the remaining mineral pulp to a separative treatment other than flotation in which such colloidal constituents as have been removed therefrom would if present exert a deleterious effect.

2. The method of improving the treatment of minerals associated in a mineral pulp with colloidal constituents, which comprises subjecting the mineral pulp to a froth-flotation operation adapted to remove from the mineral pulp a substantial amount of said colloidal constituents together with some of the valuable mineral constituents in the pulp, treating the constituents so removed from the mineral pulp to recover valuable mineral constituents therefrom, returning the valuable mineral constituents so recovered to the remaining mineral pulp, and thereafter subjecting the remaining mineral pulp to a separate treatment in which such colloidal constituents as have been removed therefrom would if present exert a deleterious effect.

3. The method of improving the treatment of minerals associated in a mineral pulp with colloidal constituents, which comprises subjecting the mineral pulp to a froth-flotation operation adapted to remove from the mineral pulp a substantial amount of said colloidal constituents together with some of the valuable mineral constituents in the pulp, treating the constituents so removed from the mineral pulp to recover valuable mineral constituents therefrom, and thereafter subjecting the remaining mineral pulp to a separate treatment in which such colloidal constituents as have been removed therefrom would if present exert a deleterious effect.

4. The method of improving the treatment of minerals associated in a mineral pulp with colloidal constituents, which comprises subjecting the mineral pulp to a froth-flotation operation adapted to remove from the mineral pulp a substantial amount of said colloidal constituents, said froth-flotation operation being preceded by appropriate conditioning of the mineral pulp for promoting the removal therefrom of colloidal constituents by froth-flotation, and thereafter subjecting the remaining mineral pulp to a separative treatment other than flotation in which such colloidal constituents as have been removed therefrom would if present exert a deleterious effect.

5. The method of improving the treatment of minerals associated in a mineral pulp with colloidal constituents, which comprises subjecting the mineral pulp to a froth-flotation operation adapted to remove from the mineral pulp a substantial amount of said colloidal constituents, said froth-flotation operation being preceded by the step of subjecting the mineral pulp to the action of a detergent agent for promoting the detachment of colloidal constituents from mineral particles in the pulp, and thereafter subjecting the remaining mineral pulp to a separative treatment in which such colloidal constituents as have been removed therefrom would if present exert a deleterious effect.

6. The method of improving the treatment of minerals associated in a mineral pulp with colloidal constituents, which comprises subjecting the mineral pulp to a froth-flotation operation adapted to remove from the mineral pulp a substantial amount of said colloidal constituents, said froth-flotation operation being preceded by the step of appropriately conditioning the mineral pulp for promoting the removal therefrom by froth-flotation of the colloidal constituents by adding to the mineral pulp an appropriate gathering agent, and thereafter subjecting the remaining mineral pulp to a separative treatment other than flotation in which such colloidal constituents as have been removed therefrom would if present exert a deleterious effect.

7. The method of improving the treatment of minerals associated in a mineral pulp with colloidal constituents, which comprises subjecting the mineral pulp to a froth-flotation operation adapted to produce a froth containing a substantial amount of said colloidal constituents together with some of the valuable mineral constituents in the pulp, treating the froth produced by the foregoing froth-flotation operation to promote dispersion or deflocculation of the colloidal constituents thereof, and removing the dispersed or deflocculated colloidal constituents from the granular material contained in the froth.

8. The method of improving the treatment of minerals associated in a mineral pulp with colloidal constituents, which comprises subjecting the mineral pulp to a froth-flotation operation adapted to remove from the mineral pulp a substantial amount of said colloidal constituents, thereafter subjecting the remaining mineral pulp to a separative treatment in which such colloidal constituents as have been removed therefrom would if present exert a deleterious effect, removing from the now remaining mineral pulp a further amount of colloidal constituents therein, and thereafter subjecting the remaining mineral pulp to a further separative treatment in which such colloidal constituents as have been removed therefrom would if present exert a deleterious effect.

9. The method of improving the treatment of minerals associated in a mineral pulp with colloidal constituents, which comprises subjecting the mineral pulp to a froth-flotation operation adapted to remove from the mineral pulp a substantial amount of said colloidal constituents, said froth-flotation operation being preceded by the step of agitating and regulating the temperature of the mineral pulp in the presence of a colloid-conditioning agent for appropriately conditioning the pulp for promoting the removal therefrom by froth-flotation of colloidal constituents, and thereafter subjecting the remaining mineral pulp to a separative treatment other than flotation in which such colloidal constituents as have been removed therefrom would if present exert a deleterious effect.

10. The method of improving the treatment of minerals associated in a mineral pulp with colloidal constituents, which comprises subjecting the mineral pulp to a froth-flotation operation adapted to remove from the mineral pulp a substantial amount of said colloidal constituents, said froth-flotation operation being preceded by the step of agitating the mineral pulp in the presence of a colloid-conditioning agent for apropriately conditioning the pulp for promoting the removal therefrom by froth-flotation of colloidal constituents, and thereafter subjecting the remaining mineral pulp to a separative treatment other than flotation in which such colloidal constituents as have been removed therefrom would if present exert a deleterious effect.

11. The method of improving the treatment of minerals associated in a mineral pulp with colloidal constituents, which comprises subjecting the mineral pulp to a froth-flotation operation adapted to remove from the mineral pulp a substantial amount of said colloidal constituents, said froth-flotation operation being preceded by the step of regulating the temperature of the mineral pulp in the presence of a colloid-conditioning agent for appropriately conditioning the pulp for promoting the removal therefrom by froth-flotation of colloidal constituents, and thereafter subjecting the remaining mineral pulp to a separative treatment in which such colloidal constituents as have been removed therefrom would if present exert a deleterious effect.

12. The method of improving the treatment of minerals associated in a mineral pulp with colloidal constituents, which comprises subjecting the mineral pulp to a froth-flotation operation adapted to remove from the mineral pulp a substantial amount of said colloidal constituents, said froth-flotation operation being preceded by the step of treating the mineral pulp with a colloid-conditioning agent for promoting the removal therefrom by froth-flotation of colloidal constituents, and thereafter subjecting the remaining mineral pulp to a separative treatment other than flotation in which such colloidal constituents as have been removed therefrom would if present exert a deleterious effect.

13. The method of improving the treatment of minerals associated in a mineral pulp with colloidal constituents, which comprises subjecting the mineral pulp to a froth-flotation operation adapted to remove from the mineral pulp a substantial amount of said colloidal constituents, said froth-flotation operation being preceded by the step of heating the mineral pulp in the presence of a colloid-conditioning agent for promoting the removal therefrom by froth-flotation of colloidal constituents, and thereafter subjecting the remaining mineral pulp to a separative treatment in which such colloidal constituents as have been removed therefrom would if present exert a deleterious effect.

14. The method of improving the treatment of minerals associated in a mineral pulp with colloidal constituents, which comprises removing a part of the colloidal constituents from the mineral pulp, thereafter subjecting the remaining mineral pulp to a separative treatment in which such colloidal constituents as have been removed therefrom would if present exert a deleterious effect, subjecting the now remaining mineral pulp to a froth-flotation operation adapted to remove from the mineral pulp a substantial amount of the colloidal constituents therein, and thereafter subjecting the remaining mineral pulp to a further separative treatment in which such colloidal constituents as have been removed therefrom would if present exert a deleterious effect.

15. The method of improving the treatment of minerals associated in a mineral pulp with colloidal constituents, which comprises subjecting the mineral pulp to a froth-flotation operation adapted to remove from the mineral pulp a substantial amount of said colloidal constituents, thereafter subjecting the remaining mineral pulp to a separative treatment in which such colloidal constituents as have been removed therefrom would if present exert a deleterious effect, adding to the now remaining mineral pulp a dispersing or deflocculating agent for promoting dispersion or deflocculation of the colloidal constituents remaining therein, removing the dispersed or deflocculated colloidal constituents to the desired extent from said remaining mineral pulp, and thereafter subjecting the remaining mineral pulp to a further separative treatment in which such colloidal constituents as have been removed therefrom would if present exert a deleterious effect.

16. The method of improving the concentration on shaking tables of minerals associated in a mineral pulp with colloidal constituents, which comprises subjecting the mineral pulp to a colloid-selective froth-flotation operation adapted to remove from the mineral pulp a substantial amount of said colloidal constituents, and thereafter subjecting the remaining mineral pulp to concentration on a shaking table in which such colloidal constituents as have been removed therefrom would if present exert a deleterious effect.

17. The method of improving the concentration on shaking tables of minerals associated in a mineral pulp with colloidal constituents, which comprises subjecting the mineral pulp to a colloid-selective froth-flotation operation adapted to remove from the mineral pulp a substantial amount of said colloidal constituents, said froth-flotation operation being preceded by the step of appropriately conditioning the mineral pulp for promoting the removal therefrom of colloidal constituents by froth-flotation, and thereafter subjecting the remaining mineral pulp to concentration on a shaking table in which such colloidal constituents as have been removed from the pulp would if present exert a deleterious effect.

18. The method of improving the treatment of minerals associated with colloidal constituents in a mineral pulp, which comprises removing a part of the colloidal constituents from the mineral pulp by a colloid-selective flotation operation, subjecting the mineral pulp thus freed of the removed colloidal constituents to a mineral treatment operation, adding to the remaining mineral pulp a dispersing or deflocculating agent for promoting dispersion or deflocculation of the colloidal constituents remaining therein, removing the dispersed or deflocculated colloidal constituents to the desired extent from said remaining mineral pulp, and thereafter subjecting such remaining mineral pulp thus freed of the removed colloidal constituents to a further mineral treatment operation.

In testimony whereof I affix my signature.

WALTER O. BORCHERDT.